(12) United States Patent
Masuyama et al.

(10) Patent No.: US 7,185,146 B2
(45) Date of Patent: Feb. 27, 2007

(54) MEMORY CARD DEVICE, AND MEMORY CARD CONTROL METHOD FOR CONTROLLING THE DEVICE

(75) Inventors: Taishi Masuyama, Machida (JP); Tetsuya Kaise, Hino (JP); Akio Yazawa, Osato-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 365 days.

(21) Appl. No.: 10/930,872

(22) Filed: Sep. 1, 2004

(65) Prior Publication Data

US 2005/0204092 A1    Sep. 15, 2005

(30) Foreign Application Priority Data

Mar. 11, 2004    (JP)    ............................. 2004-069424

(51) Int. Cl.
*G06F 12/00*    (2006.01)
*G06F 13/00*    (2006.01)
*G06F 13/28*    (2006.01)

(52) U.S. Cl. ...................................... 711/115
(58) Field of Classification Search ................. 711/202
See application file for complete search history.

(56) References Cited

U.S. PATENT DOCUMENTS 4,473,877 A * 9/1984 Tulk .............................. 711/2
5,630,098 A * 5/1997 Vermeer et al. ............ 711/172
6,430,648 B1 * 8/2002 Carnevale ...................... 711/5

FOREIGN PATENT DOCUMENTS

| JP | 6-274412 | 9/1994 |
|---|---|---|
| JP | 2000-357126 | 12/2000 |
| JP | 2001-51897 | 2/2001 |

\* cited by examiner

*Primary Examiner*—Hyung Sough
*Assistant Examiner*—Hamdy Ahmed
(74) *Attorney, Agent, or Firm*—Oblon, Spivak, McClelland, Maier & Neustadt, P.C.

(57) ABSTRACT

A memory card device includes a host interface unit configured to receive a plurality of commands from a host apparatus, the commands including at least a memory access command with a memory address of a specific bit width, a nonvolatile semiconductor memory which includes a storage area whose memory size is larger than a maximum memory size that is addressable by the memory address, a bank identification number management unit configured to divide the storage area into a plurality of banks and manage a plurality of bank identification numbers corresponding to the banks, a bank designation unit configured to designate one of the banks in accordance with a bank identification number included in a bank designation command transmitted from the host apparatus, and a memory control unit configured to access the designated one of the banks in accordance with the memory access command with the memory address.

15 Claims, 11 Drawing Sheets

| | Bank ID | Upper 2 bits of absolute address |
|---|---|---|
| Bank 3 | 3 | 0x3 (11) |
| Bank 2 | 2 | 0x2 (10) |
| Bank 1 | 1 | 0x1 (01) |
| Bank 0 | 0 | 0x0 (00) |

0x:hexadecimal

| | Upper 2 bits of absolute address | Command argument | Absolute address |
|---|---|---|---|
| Bank 3 | 0x3 (11) | 0xFFFFFFFF ~ 0x00000000 | 0x3FFFFFFFF ~ 0x300000000 |
| Bank 2 | 0x2 (10) | 0xFFFFFFFF ~ 0x00000000 | 0x2FFFFFFFF ~ 0x200000000 |
| Bank 1 | 0x1 (01) | 0xFFFFFFFF ~ 0x00000000 | 0x1FFFFFFFF ~ 0x100000000 |
| Bank 0 | 0x0 (00) | 0xFFFFFFFF ~ 0x00000000 | 0x0FFFFFFFF ~ 0x000000000 |

FIG. 4

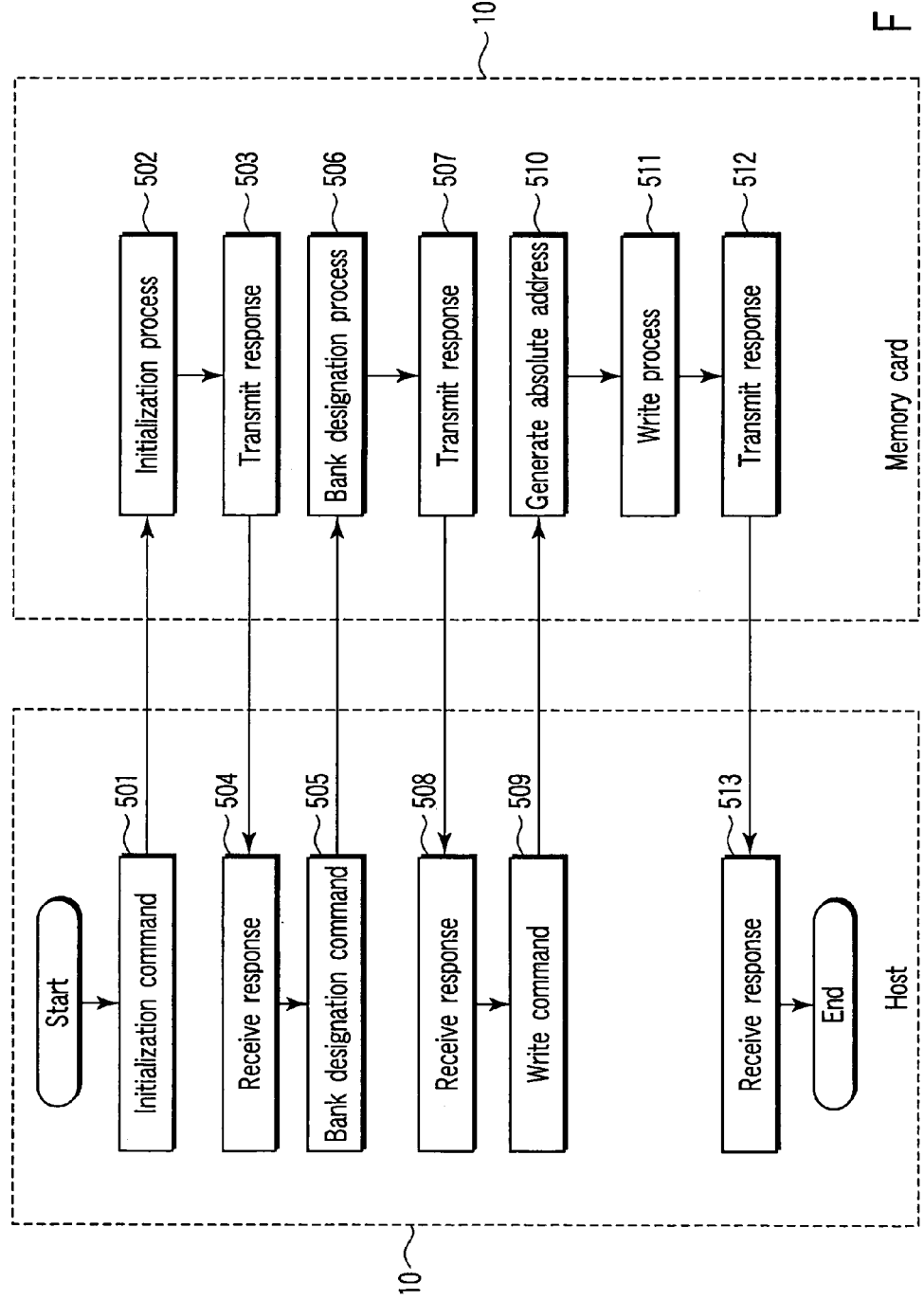
F I G. 5

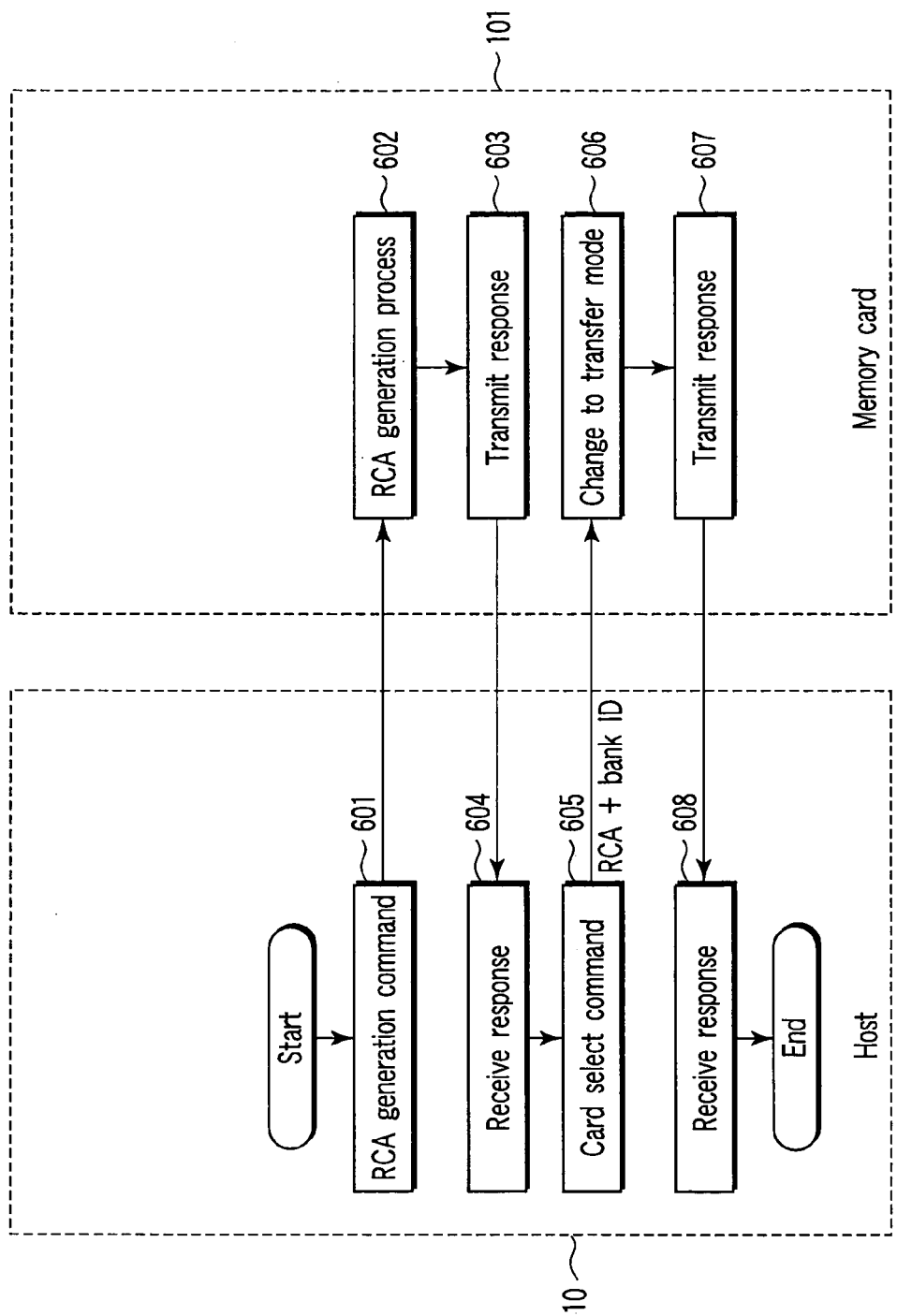
F I G. 6

| | Bank ID when RCA is used | Upper 2 bits of absolute address |
|---|---|---|
| Bank 3 | 0x1103 | 0x3 (11) |
| Bank 2 | 0x1102 | 0x2 (10) |
| Bank 1 | 0x1101 | 0x1 (01) |
| Bank 0 | 0x1100 | 0x0 (00) |
F I G. 7
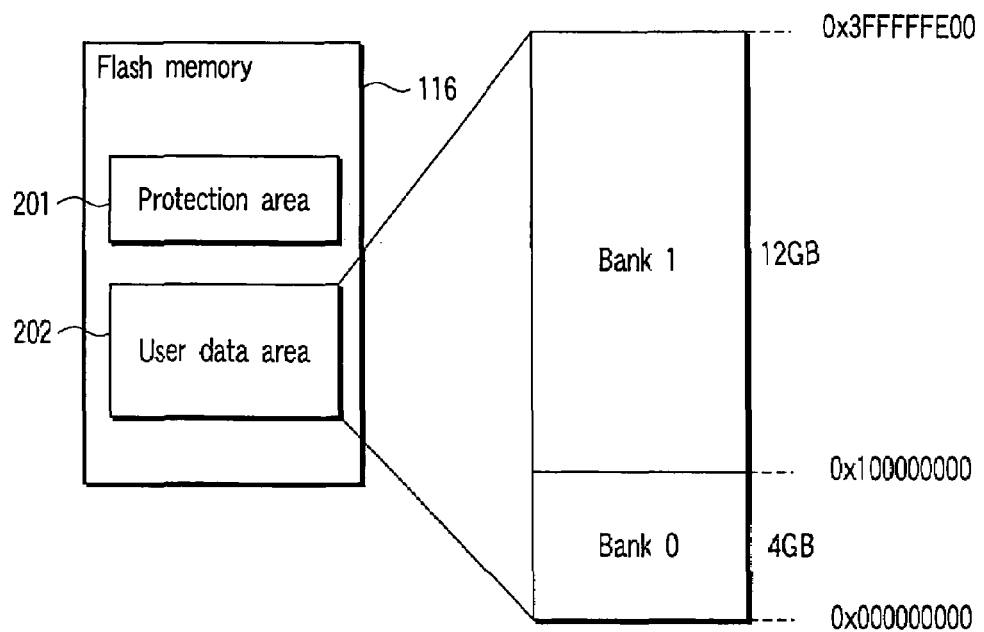
F I G. 9

FIG. 10

| | Bank ID |
|---|---|
| Bank 1 | 1 |
| Bank 0 | 0 |

FIG. 11

| | Command argument | Absolute address |
|---|---|---|
| Bank 1 | 0x01FFFFFF ~ 0x00800000 | 0x3FFFFFE00 ~ 0x100000000 |
| Bank 0 | 0xFFFFFFFF ~ 0x00000000 | 0x0FFFFFFFF ~ 0x000000000 |

FIG. 14

| Accessible bank number | Number of times of reception of bank designation command |
|---|---|
| 0 | 3 |
| 1 | 5 |
| 2 | 7 |
| 3 | 9 |

MEMORY CARD DEVICE, AND MEMORY CARD CONTROL METHOD FOR CONTROLLING THE DEVICE

CROSS-REFERENCE TO RELATED APPLICATIONS

This application is based upon and claims the benefit of priority from prior Japanese Patent Application No. 2004-069424, filed Mar. 11, 2004, the entire contents of which are incorporated herein by reference.

BACKGROUND OF THE INVENTION

1. Field of the Invention

The present invention relates to a memory card device which is detachably connected to a host apparatus, and a memory card control method for controlling that device.

2. Description of the Related Art

In recent years, digital devices have been developed extensively along with the digitization of contents data such as audio and video data. Most of these digital devices comprise storage devices such as a compact disk drive, hard disk drive, and the like so as to record contents data.

Recently, digital devices have been downsized and, for example, as a digital device such as a music player, a product having a main body size of several cm$^2$ is commercially available. In such compact digital devices, recording media must also be downsized. As compact recording media, memory cards which incorporate nonvolatile semiconductor memories have received a lot of attention.

As one type of such memory cards, a memory card having a copyright protection function is known. Jpn. Pat. Appln. KOKAI Publication No. 2000-357126 discloses a memory card which has a revocation function of revoking illicit devices as the copyright protection function.

An SD (Secure Digital) memory card has a copyright protection function, and incorporates a NAND flash EEPROM. The NAND flash EEPROM is one type of nonvolatile semiconductor memories, and is electrically rewritable. The NAND flash EEPROM is categorized as flash memories. In a flash memory, a minimum area that can be erased per erase operation is specified as an erase block, and the data erase operation is always done for each of erase blocks. Therefore, a flash memory is suited to record large-capacity files rather than the random access purposes that involve frequent data update processes.

However, the SD memory card adopts an addressing method that designates an access position by bytes using a 32-bit memory address appended to each memory access command from a host apparatus (to be referred to a byte addressing method hereinafter). For this reason, the upper limit of the memory size of the SD memory card is limited to $2^{32}$ bytes, i.e., 4 GB.

If an addressing method that designates an access position by blocks each of which is formed by combining a plurality of bytes (to be referred to as a block addressing method hereinafter) is used in place of the byte addressing method, a memory address space of 4 GB or more can be accessed even when the 32-bit memory address is used.

However, when the block addressing method is simply adopted, compatibility with existing host apparatuses which do not support the block addressing method cannot be maintained. That is, data groups which form one file may be written apart in a memory address space beyond 4 GB due to file fragmentation. In this situation, taking a memory card with a total memory size of 8 GB as an example, some data which form given file A are preset at positions within lower 4 GB in the 8 GB memory space, but the remaining data of that file A are present at positions within upper 4 GB. When data groups which form one file are scattered in the memory address space beyond 4 GB, an existing host apparatus which does not support the block addressing method but supports only the byte addressing method can no longer correctly read that file. This is because, the maximum memory space that can be accessed by the byte addressing method is 4 GB. Hence, a new mechanism for expanding the memory space of the memory card is demanded.

BRIEF SUMMARY OF THE INVENTION

According to an embodiment of the present invention, there is provided a memory card device which is detachably connected to a host apparatus comprising: a host interface unit configured to communicate with the host apparatus and receive a plurality of commands from the host apparatus, the commands including at least a memory access command with a memory address of a specific bit width; a nonvolatile semiconductor memory which includes a storage area whose memory size is larger than a maximum memory size that is addressable by the memory address of the specific bit width; a bank identification number management unit configured to divide the storage area of the nonvolatile semiconductor memory into a plurality of banks and manage a plurality of bank identification numbers corresponding to the banks; a bank designation unit configured to designate one of the banks in accordance with a bank identification number included in a bank designation command transmitted from the host apparatus; and a memory control unit configured to access the designated one of the banks in accordance with the memory access command with the memory address of the specific bit width.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a table showing the relationship among the upper 2 bits of the absolute addresses corresponding to respective banks in the memory card in FIG. 1, command arguments, and 34-bit absolute addresses;

FIG. 5 is a flowchart showing the operation of the memory card in FIG. 1;

FIG. 6 is a flowchart showing the operation of designating a bank using a card select command in the memory card in FIG. 1;

FIG. 7 shows another example of the bank ID table used in the memory card in FIG. 1;

FIG. 9 shows the bank configuration of a nonvolatile semiconductor memory arranged in the memory card in FIG. 8;

FIG. 10 shows an example of a bank ID table used in the memory card in FIG. 8;

FIG. 11 is a table showing the relationship between the command arguments and 34-bit absolute addresses, which correspond to respective banks in the memory card in FIG. 8;

FIG. 14 shows an example of an access control table used in the memory card in FIG. 13.

DETAILED DESCRIPTION OF THE INVENTION

Embodiments of the present invention will be described hereinafter with reference to the accompanying drawings.

(First Embodiment)

Figure 1:
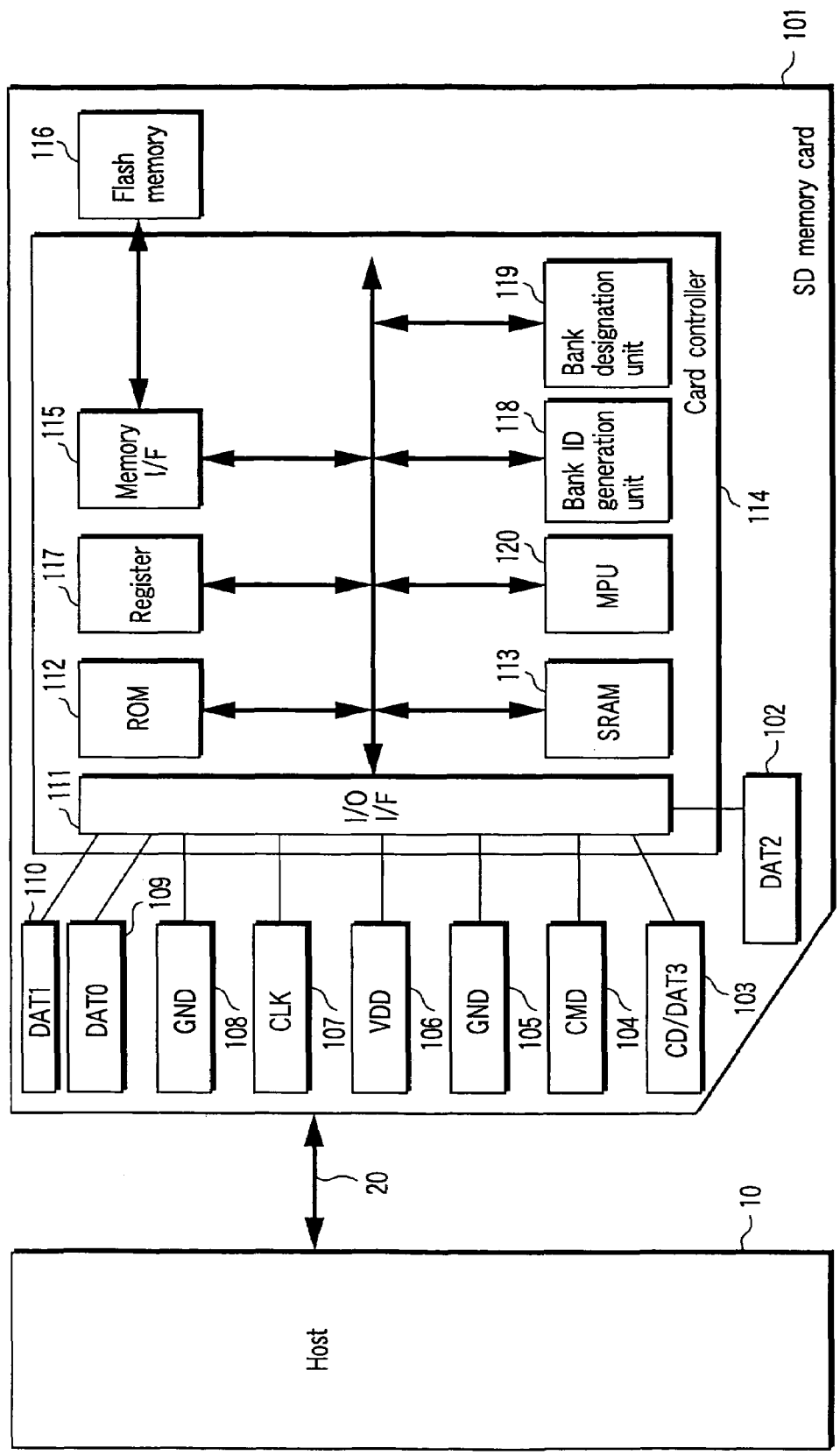
FIG. 1 is a block diagram showing the arrangement of a memory card according to the first embodiment of the present invention.

FIG. 1 is a block diagram showing the arrangement of a memory card according to the first embodiment of the present invention. A memory card 101 is detachably connected to a host apparatus 10, and is implemented as, e.g., an SD (Secure Digital) memory card. The SD memory card 101 is a removable storage device which is detachably inserted into a memory card slot (SD card slot) provided to the host apparatus 10 such as a personal computer, PDA (Personal Digital Assistants), camera, portable phone, and the like. All communications between the host apparatus and SD memory card 101 are controlled by commands from the host apparatus 10.

A bus (SD bus) 20 that connects the host apparatus 10 and SD memory card 101 includes six communication lines (data DAT0 to DAT3, command CMD, and clock CLK), and three power supply lines (VDD, GND, GND). The SD memory card 101 has four data pins [DAT0 to DAT3] 109, 110, 102, and 103, command pin [CMD] 104, clock signal pin [CLK] 107, power supply pin [VDD] 106, and two ground pins [GND] 105 and 108. The functions of the six communication lines (data DAT0 to DAT3, command CMD, and clock CLK) are as follows.

DAT0 to DAT3: The respective data lines are two-way signal lines which are used in data transfer between the host apparatus 10 and SD memory card 101. The host apparatus 101 and SD memory card 101 respectively operate in the push-pull mode.

CMD: The command signal line is a two-way signal line. This signal line is used to transfer commands from the host apparatus 10 to the SD memory card 101, and to transfer responses from the SD memory card 101 to the host apparatus 10. Memory access commands such as read and write commands include 32-bit memory addresses as their command arguments.

CLK: The clock signal line is a signal line used to transmit clock signals CLK from the host apparatus 10 to the SD memory card 101. Command transfer from the host apparatus 10 to the SD memory card 101, data transfer between the host apparatus 10 and SD memory card 101, and the like are executed in synchronism with the clock signals CLK which are supplied from the host apparatus 10 to the SD memory card 101.

The SD memory card 101 has a card controller 114 and flash memory 116. The flash memory 116 is an electrically erasable, rewritable nonvolatile semiconductor memory device, and comprises, e.g., one or more NAND flash EEPROM chips. In this embodiment, the flash memory 116 includes a storage area with a memory size larger than a maximum memory size (4 GB) that can be addressed by the 32-bit memory address.

The storage area of the flash memory 116 is formed of a large number of erase blocks. Each erase block size is, for example, 8 KB, 16 KB, or 32 KB. Each erase block includes a plurality of pages. One page normally has 528 (512+16) bytes. 512 bytes are used for a data storage area, and 16 bytes are used for a redundant area that stores an error correction code and the like. If the erase block size is 8 KB, one erase block has 16 pages. If the erase block size is 16 KB, one erase block has 32 pages. If the erase block size is 32 KB, one erase block has 64 pages. For example, a 64 MB flash EEPROM has 528 bytes×32 pages×4096 erase blocks.

The SD memory card 101 separately manages the flash memory 116 as a user data area and protection area, and normal commands can read/write only this user data area. In order to access the protection area, a predetermined authentication process is required. This authentication process exploits a CPRM (Content Protection for Recordable Media: http://www.4centity.com/tech/cprm/) scheme. With this scheme, a function of suppressing accesses from illicit devices and the like can be implemented.

The card controller 114 is a controller which accesses the flash memory 116 in accordance with commands from the host apparatus 10. This card controller 114 comprises an I/O interface unit (I/O I/F) 111, ROM 112, SRAM 113, memory interface (memory I/F) 115, register 117, bank ID generation unit 118, bank designation unit 119, and MPU (Micro Processing Unit) 120.

The I/O interface unit (I/O I/F) 111 is a host interface unit used to make communications with the host apparatus 10. The ROM 112 stores a program (firmware) to be executed by the MPU 120. The memory interface 115 is a memory control unit that accesses the flash memory 116 in accordance with memory access commands from the host apparatus 10 under the control of the MPU 120. The register 117 is used to hold various kinds of information associated with the SD memory card 101. The bank ID generation unit 118 is a bank identification number management unit, which divides the storage area of the flash memory 116 into a plurality of banks (a plurality of storage areas), and manages a plurality of bank identification numbers corresponding to these banks. This bank ID generation unit 118 generates a plurality of bank identification numbers (bank IDs) to be respectively assigned to the plurality of banks. The bank designation unit 119 designates one of the plurality of banks as an access target bank in accordance with a bank identification number transmitted from the host apparatus 10. The MPU 120 is a processor which controls the operation of the SD memory card 101, and executes firmware that is loaded from the ROM 112 onto the SRAM 113. The MPU 120 divides the storage area of the flash memory 116 into a plurality of banks and manages them using the bank ID generation unit 118 and bank designation unit 119, and accesses the bank designated by the bank identification number from the host apparatus 10 in accordance with memory access commands (write command, read command, and the like) from the host apparatus 10. In order to maintain compatibility with an existing host apparatus which does not support the block addressing method, addressing (address designation) of respective banks is executed using the byte addressing method.

An example of the configuration of the flash memory 116 will be described below with reference to FIG. 2.

Figures 2, 3:
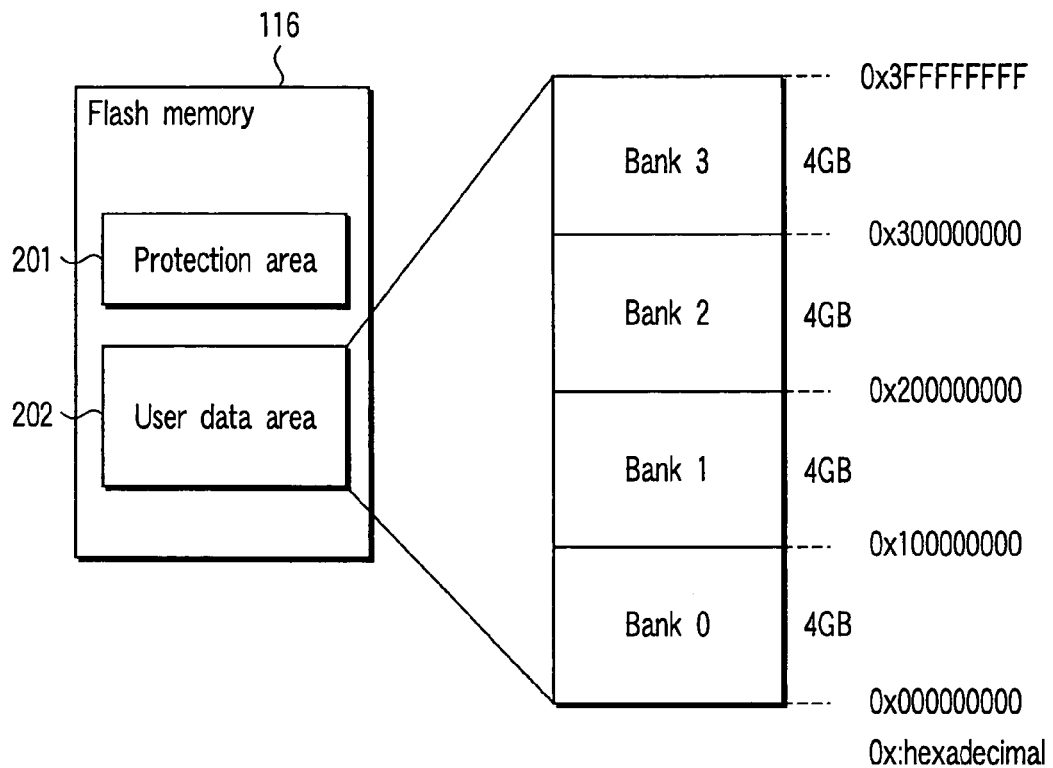
FIG. 2 shows the bank configuration of a nonvolatile semiconductor memory arranged in the memory card in FIG. 1.
FIG. 3 shows an example of a bank ID table used in the memory card in FIG. 1.

As shown in FIG. 2, the storage area of the flash memory 116 is divided into a protection area 201 and user data area 202. The memory size of the user data area 202 is larger than a maximum memory size (4 GB) that can be addressed by the 32-bit memory address which is appended to each memory access command as a command argument, the memory size of the user data area 202 is, e.g., 16 GB. The user data area 202 is divided into four banks (banks 0 to 3) and is managed by the bank ID generation unit 118. That is, banks 0, 1, 2, and 3 are assigned in turn from the lower address side to the 16 GB memory address space (a space of 000000000 to 3FFFFFFFF (hex)) of the user data area 202. The memory sizes of these banks 0 to 3 are equal to or smaller than the maximum memory size (4 GB) that can be addressed by the 32-bit memory address. In this embodiment, each bank has a memory size of 4 GB.

FIG. 3 shows an example of a bank ID table managed by the bank ID generation unit 118. This bank ID table specifies the relationship between the bank IDs corresponding to banks 0 to 3, and the upper 2 bits of absolute addresses corresponding to respective banks. The absolute addresses are 34-bit memory addresses that can address the 16 GB memory address space (a space of 000000000 to 3FFFFFFFF (hex)) of the user data area 202. The bank designation unit 119 acquires the upper 2 bits of the absolute address corresponding to the bank ID designated from the host apparatus 10 by looking up the bank ID table in FIG. 3, which is managed by the bank ID generation unit 118. The 34-bit absolute memory address can be generated based on the upper 2 bits and the 32-bit memory address given as a command argument of each memory address command from the host apparatus 10.

FIG. 4 shows the relationship among the upper 2 bits of the absolute addresses corresponding to respective banks, command arguments (32-bit memory addresses), and 34-bit absolute addresses.

As described above, the 32-bit memory address is given from the host apparatus 10 together with each memory access command as its argument. The maximum value of the 32-bit memory address is FFFFFFFF (hex).

If the bank ID designated by the host apparatus 10 is 0, the bank designation unit 119 generates a 34-bit absolute memory address by appending the upper 2 bits "00" to the 32-bit memory address included in a memory access command from the host apparatus 10, so as to select bank 0. If the bank ID designated by the host apparatus 10 is 1, the bank designation unit 119 generates a 34-bit absolute memory address by appending the upper 2 bits "01" to the 32-bit memory address included in a memory access command from the host apparatus 10, so as to select bank 1. If the bank ID designated by the host apparatus 10 is 2, the bank designation unit 119 generates a 34-bit absolute memory address by appending the upper 2 bits "10" to the 32-bit memory address included in a memory access command from the host apparatus 10, so as to select bank 2. If the bank ID designated by the host apparatus 10 is 3, the bank designation unit 119 generates a 34-bit absolute memory address by appending the upper 2 bits "11" to the 32-bit memory address included in a memory access command from the host apparatus 10, so as to select bank 3.

The operation of the SD memory card 101 will be described below with reference to FIG. 5. Assume that write data from the host apparatus 10 is written in an arbitrary bank.

In step 501, the host apparatus 10 transmits an initialization command to the SD memory card 101 via the command (CMD) line. The card controller 114 of the SD memory card 101 executes a predetermined initialization process in step 502, and transmits a response indicating the end of the initialization process to the host apparatus 10 via the command (CMD) line in step 503. In step 504, the host apparatus 10 receives the response, and confirms the end of the initialization process.

The host apparatus 10 transmits a bank designation command which includes the bank identification number (bank ID) used to designate a bank to be accessed to the SD memory card 101 via the command (CMD) line in step 505. The card controller 114 of the SD memory card 101 executes, as a bank designation process, a process for converting the bank ID value included in the bank designation command from the host apparatus 10 into the upper 2 bits of an absolute address using the aforementioned bank ID table, and holds the converted upper 2-bit value in step 506. In step 507, the card controller 114 of the SD memory card 101 transmits a response indicating the end of the bank designation process to the host apparatus 10 via the command (CMD) line. In step 508, the host apparatus 10 receives the response, and confirms the end of the bank designation process.

In step 509, the host apparatus 10 transmits a write command to the SD memory card 101 via the command (CMD) line. This write command is appended with a 32-bit memory address as its command argument. Upon reception of the write command, the card controller 114 of the SD memory card 101 generates a 34-bit absolute address by extracting the 32-bit memory address value from the command argument appended to the write command, and expanding this 32-bit memory address value using the held upper 2-bit value in step 510. In step 511, the card controller 114 of the SD memory card 101 executes a write process for writing write data, which is transmitted from the host apparatus 10 via the data (DAT0 to DAT3) lines after the write command, at a storage position (location) in the flash memory 116 designated by the 34-bit absolute address. In the write process, the absolute address, write data, and write control signal are supplied to the flash memory 116 via the memory I/F 115. The bank which is to undergo the write process is determined by the upper 2-bit value, and the storage position in that bank which is to undergo the write process is determined by the 32-bit memory address value appended to the write command. When a write command is received from an existing host apparatus having no bank designation function, i.e., when a write command is received without receiving any bank designation command, the card controller 114 of the SD memory card 101 always selects bank 0 as a bank to be accessed.

In step 512, the card controller 114 of the SD memory card 101 transmits a response indicating the completion of the write process to the host apparatus 10 via the command (CMD) line. In step 513, the host apparatus 10 receives the response and confirms the completion of the write process.

When a write access to the identical bank is executed a plurality of number of times, the host apparatus 10 need only transmit a bank designation command only once before it transmits the first write command. After that, the host apparatus 10 can transmit only write commands without transmitting any bank designation command.

As the bank ID value, an arbitrary value that can uniquely identify each bank can be used. Furthermore, the bank designation command including the bank ID need not always be a command dedicated to bank designation. Various other existing commands may be used as bank designation commands as long as they can include the bank ID value as a command argument.

As described above, according to this embodiment, the bank to be accessed is designated by the bank ID from the host apparatus 10, and a write access to that designated bank to be accessed is then executed according to a write command from the host apparatus 10. Hence, the host apparatus 10 can access a memory address space larger than that which can be accessed by the 32-bit memory address (byte address) by only changing the bank to be accessed. In this manner, the accessible memory address space can be expanded while maintaining the compatibility to existing host apparatuses that do not support the block addressing method. Furthermore, upon writing a file, some write accesses for writing data groups which form the file are executed to the designated bank while a given bank is designated. For this reason, even when file fragmentation has occurred, data groups which form a single file can be prevented from being stored across different banks. Therefore, even an existing host apparatus having no bank designation function can normally read all data groups which form a file present in bank 0.

Note that a data read process is executed in the same sequence as in FIG. 5. Banks 0 to 3 may comprise four flash EEPROM chips. In this case, one of the four flash EEPROM chips is designated as a bank to be accessed by supplying a chip enable signal to that flash EEPROM chip in accordance with the upper 2-bit value of the absolute memory address. Then, an access to the designated flash EEPROM chip is executed according to a memory access command which includes the 32-bit memory address.

A case will be explained below wherein a card select command (CMD7) is used as a bank designation command.

The card select command (CMD7) is used to switch the operation mode of the SD memory card 101 to a data transfer mode that can execute data transfer with the host apparatus. The card select command (CMD7) includes a card address which is called an RCA (Relative Card Address), and is used to identify the SD memory card 101. Upon reception of a card select command which includes its own RCA, the SD memory card 101 switches its operation mode to the data transfer mode. In the data transfer mode, the SD memory card 101 can normally accept memory access commands (read command, write command, and the like) from the host apparatus 10. Hence, upon executing normal read and write accesses to the SD memory card 101, the SD memory card 101 must be set in the data transfer mode by issuing a card select command to the SD memory card 101 before memory access commands.

Therefore, when a card select command (CMD7) that includes the RCA and bank ID is transmitted to the SD memory card 101, a transition instruction to the data transfer mode and designation of a bank to be accessed can be attained by a single command.

FIG. 6 shows the sequence of the process for designating the bank to be accessed using the card select command (CMD7).

In step 601, the host apparatus 10 transmits an RCA generation command (CMD3) to the SD memory card 101 via the command (CMD) line. The RCA generation command (CMD3) requests the SD memory card 101 to generate an RCA (or to issue the RCA). The card controller 114 of the SD memory card 10 generates the RCA by itself in step 602, and returns that RCA as a response to the host apparatus 10 via the command (CMD) line in step 603. In step 604, the host apparatus 10 receives the response from the SD memory card 101 and acquires the RCA. In step 605, the host apparatus 10 transmits a card select command (CMD7) to the SD memory card 101. This card select command (CMD7) includes the RCA of the SD memory card 101 and the bank ID used to designate a bank to be accessed. Note that the card select command (CMD7) need not always independently include the RCA and bank ID, and the RCA value included in the card select command (CMD7) may be commonly used as the bank ID.

In step 606, the card controller 114 of the SD memory card 101 switches its operation mode to the data transfer mode. Also, the card controller 114 executes, as a bank designation process, a process for converting the bank ID value included in the card select command (CMD7) into the upper 2 bits of an absolute address, and holds that upper 2-bit value. In step 607, the card controller 114 of the SD memory card 101 returns a response indicating that the operation mode has been switched to the data transfer mode to the host apparatus 10. The host apparatus 10 receives the response in step 608 to confirm that the SD memory card 101 has been switched to the data transfer mode.

If the RCA value acquired from the SD memory card 101 in step 604 is to be changed, the host apparatus 101 can receive a new RCA value from the SD memory card 101 by repeating steps 601 to 604.

When the RCA value included in the card select command (CMD7) is used as the bank ID in place of use of the card select command (CMD7) including the RCA and bank ID, the bank ID generation unit 118 generates bank IDs respectively corresponding to banks 0 to 3 on the basis of the RCA value issued to the host apparatus 10.

FIG. 7 shows an example of a bank ID table when a value generated based on the RCA is used as the bank ID. Referring to FIG. 7, the RCA value itself is used as the bank ID corresponding to bank 0. Also, the bank ID corresponding to bank 1 is RCA+1, the bank ID corresponding to bank 2 is RCA+2, and the bank ID corresponding to bank 3 is RCA+3.

FIG. 7 shows a case wherein the RCA value transmitted from the SD memory card 101 to the host apparatus 10 is 0x1100, and the bank IDs of banks 0, 1, 2, and 3 are respectively 0x1100, 0x1101, 0x1102, and 0x1103. In the bank ID table in FIG. 7, the upper 2-bit values of the absolute addresses are set in correspondence with RCA, RCA+1, RCA+2, and RCA+3.

In this manner, the bank IDs of banks 0, 1, 2, and 3 are generated based on the RCA value, and these bank IDs and the upper 2-bit values of the absolute addresses are held in correspondence with each other using the bank ID table. The host apparatus 10 can designate a desired bank by issuing a card select command which includes the following value as a card argument.

When bank 0 is to be selected, the host apparatus 10 issues a card select command which includes, as a command argument, the RCA acquired from the SD memory card 101. An existing host apparatus 10 which has no bank designation function always issues a card select command which includes the RCA acquired from the SD memory card 101 as a command argument. For this reason, when the SD memory card 101 is attached to the existing host apparatus 10 which has no bank designation function, bank 0 can be automatically selected as a bank to be accessed.

When bank 1 is to be selected, the host apparatus 10 issues a card select command which includes, as a command argument, RCA+1, i.e., a value obtained by adding +1 to the RCA acquired from the SD memory card 101. When bank 2 is to be selected, the host apparatus 10 issues a card select command which includes, as a command argument, RCA+2, i.e., a value obtained by adding +2 to the RCA acquired from the SD memory card 101. When bank 3 is to be selected, the host apparatus 10 issues a card select command which includes, as a command argument, RCA+3, i.e., a value obtained by adding +3 to the RCA acquired from the SD memory card 101.

In the above description, the bank ID values corresponding to banks 0, 1, 2, and 3 are generated by adding 0, 1, 2, and 3 to the RCA value. Alternatively, the bank ID values may be generated by applying other arithmetic operations to the RCA value, e.g., by subtracting 0, 1, 2, and 3 from the RCA value, by inverting corresponding bits of the RCA value, and so forth.

The command argument of the card select command has a 32-bit size. The upper 16 bits of the command argument is used to indicate the RCA value, and the lower 16 bits are reserved bits. For this reason, in place of changing the RCA value to be set in the command argument of the card select command like RCA, RCA+1, RCA+2, and RCA+3, RCA may always be set in the upper 16 bits, and the value to be set in the reserved bits may be changed like 0, 1, 2, and 3, or RCA, RCA+1, RCA+2, and RCA+3. In this case, the bank designation unit 19 acquires the bank ID from the reserved bits included in the command argument of the card select command, and converts it into the upper bits of the absolute address by looking up the bank ID table. Also, not only the card select command but also other commands that include the RCA value as command arguments can be used as bank designation commands.

As described above, when the method of designating a bank using the card select command is used, a bank to be accessed can be designated without using any command dedicated to bank designation. Especially, when the bank ID value assigned to bank 0 is set to be equal to the RCA value, an arbitrary existing host can always normally access bank 0.

The above example has been explained under the condition of the method in which the bank ID generation sequence is determined in advance between the host apparatus 10 and SD memory card 101. Alternatively, the SD memory card 101 may notify the host apparatus 10 of the bank IDs corresponding to respective banks. For example, the SD memory card 101 may transmit RCA values corresponding to banks 0 to 3 to the host apparatus 10, and these RCA values may be used as the bank IDs corresponding to banks 0 to 3. The SD memory card 101 can issue an RCA value for the next bank when an RCA generation command (CMD3) has been issued a predetermined number of times. If the predetermined number of times is 3, the SD memory card 101 generates an RCA value for bank 0 in response to the first to third RCA generation commands; that for bank 1 in response to the fourth to sixth RCA generation commands; that for bank 2 in response to the seventh to ninth RCA generation commands; and that for bank 3 in response to the 10th to 12th RCA generation commands.

When the command argument value included in the received RCA generation command is not 0, or when the command argument included in the received RCA generation command indicates the already generated RCA value, the SD memory card 101 may issue an RCA value for the next bank. In this case, the host apparatus 10 transmits an RCA generation command which includes 0 as a command argument to the SD memory card 101, thus acquiring an RCA value for bank 0. Next, the host apparatus 10 transmits an RCA generation command which includes the RCA value for bank 0 as a command argument to the SD memory card 101, thus acquiring an RCA value for bank 1. Also, the host apparatus 10 transmits an RCA generation command which includes the RCA value for bank 1 as a command argument to the SD memory card 101, thus acquiring an RCA value for bank 2. Finally, the host apparatus 10 transmits an RCA generation command which includes the RCA value for bank 2 as a command argument to the SD memory card 101, thus acquiring an RCA value for bank 3.

In the first embodiment described above, the user data area of the flash memory 116 is divided into four banks. However, the number of banks is not limited to four, and the user data area may be divided into five or more banks.

(Second Embodiment)

The SD memory card 101 according to the second embodiment of the present invention will be described below.

In the first embodiment, the 16 GB memory area is divided into four banks each having a 4 GB memory size. In the second embodiment, the 16 GB memory area is divided into two banks, i.e., bank 0 for lower 4 GB, and bank 1 for upper 12 GB. Addressing to bank 0 is implemented using the byte addressing method, and that to bank 1 is implemented using the block addressing method. The host apparatus 10 designates a bank by the same method as in the first embodiment, and then addresses the lower 4 GB using the aforementioned byte addressing method or the upper 12 GB using the aforementioned block addressing method.

Figure 8:
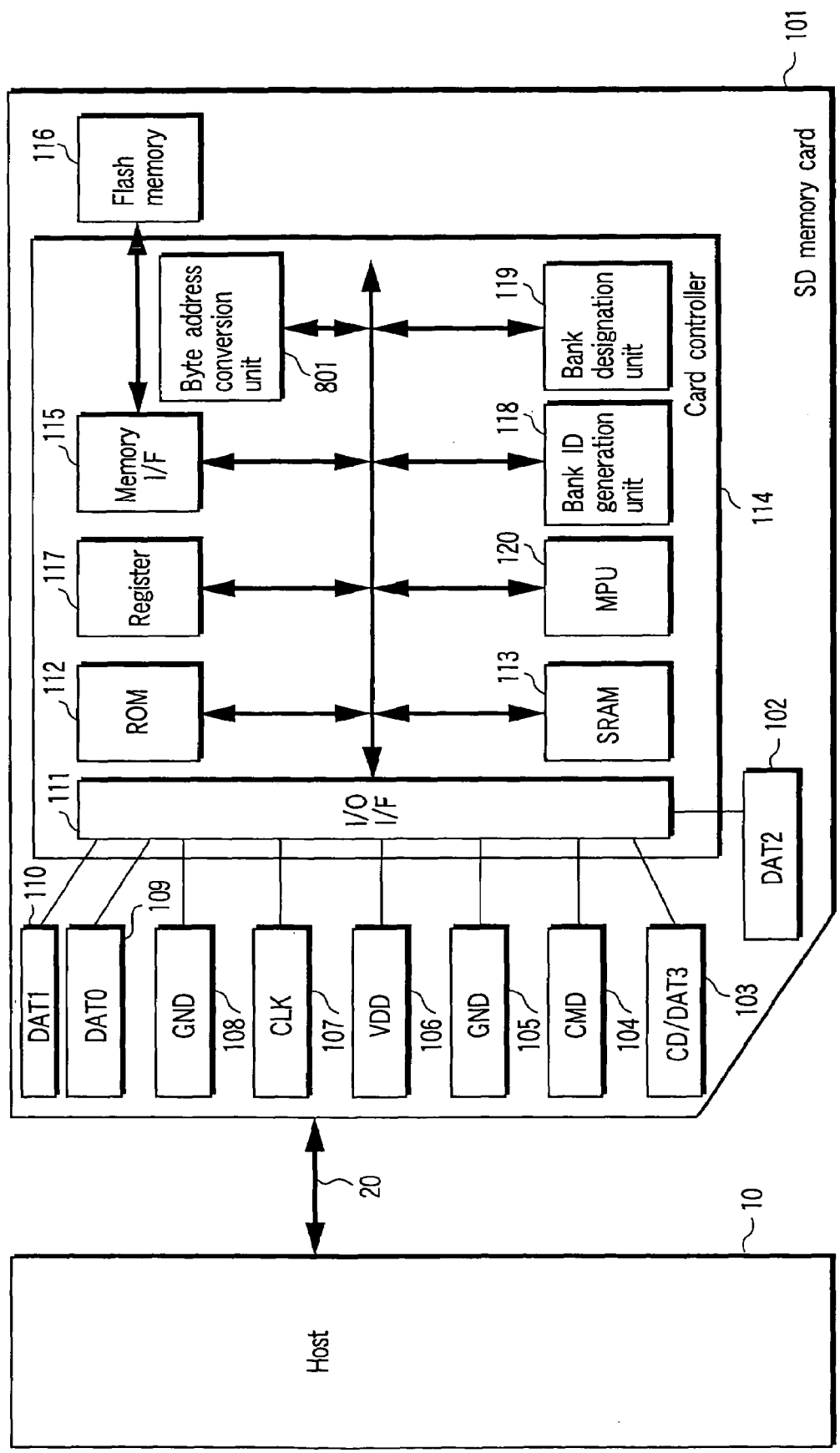
FIG. 8 is a block diagram showing the arrangement of a memory card according to the second embodiment of the present invention.

FIG. 8 is a block diagram showing the arrangement of the SD memory card 101 according to the second embodiment. The card controller 114 of this SD memory card 101 comprises a byte address conversion unit 801 in addition to the arrangement shown in FIG. 1. Also, firmware stored in the ROM 112 is configured to selectively use the byte and block addressing methods. Other components are the same as those in FIG. 1.

The bank ID generation unit 118 generates bank identification numbers (bank IDs) required to separately manage the storage area of the flash memory 116 as two banks. The bank designation unit 119 designates a bank to be accessed in accordance with the bank identification number (bank ID) from the host apparatus 10. The byte address conversion unit 801 converts a block memory address appended to a memory access command transmitted from the host apparatus 10 into a byte address when the block addressing method is used. For example, if one block=512 bytes, the byte address conversion unit 801 converts a block memory address value into a byte address value required to actually access the storage area of the flash memory 116 by multiplying the block memory address value by 512.

The block memory addresses can designate storage positions for each of blocks, i.e., at intervals of 512 bytes. For example, when block memory addresses designate:

0x00000000
0x00000001
0x00000002 they are converted into byte addresses:

0x00000000
0x00000200
0x00000400

The ROM 112 stores firmware which is modified to interpret the block addressing method. The MPU 120 executes this firmware, and can interpret block addressing.

An example of the configuration of the flash memory 116 will be described below with reference to FIG. 9.

As shown in FIG. 9, the storage area of the flash memory 116 is divided into a protection area 201 and user data area 202. The memory size of the user data area 202 is, e.g., 16 GB. That is, banks 0 and 1 are assigned in turn from the lower address side to the 16 GB memory address space (a space of 000000000 to 3FFFFFFFF (hex)) of the user data area 202. The memory sizes of bank 0 is 4 GB, and that of bank 2 is 12 GB.

FIG. 10 shows an example of a bank ID table managed by the bank ID generation unit 118. This bank ID table specifies bank IDs which respectively correspond to banks 0 and 1. In this case, the bank ID corresponding to bank 0 is 0, and that corresponding to bank 1 is 1. Alternatively, the RCA values may be used as the bank IDs as in the first embodiment.

FIG. 11 shows the relationship between the command arguments (32-bit memory addresses) corresponding to respective banks and 34-bit absolute addresses.

As described above, the 32-bit memory address is given from the host apparatus 10 together with each memory access command as its argument. The 32-bit memory address corresponding to bank 0 is a byte address, and that corresponding to bank 1 is a block address.

If the bank ID designated by the host apparatus 10 is 0, the bank designation unit 119 generates a 34-bit absolute memory address (byte address) required to access bank 0 by appending the upper 2 bits "00" to the 32-bit memory address included in a memory access command from the host apparatus 10. If the bank ID designated by the host apparatus 10 is 1, the bank designation unit 119 generates a 34-bit absolute memory address (byte address) required to access bank 1 by multiplying the 32-bit memory address (block address) included in a memory access command from the host apparatus 10 by 512.

Figure 12:
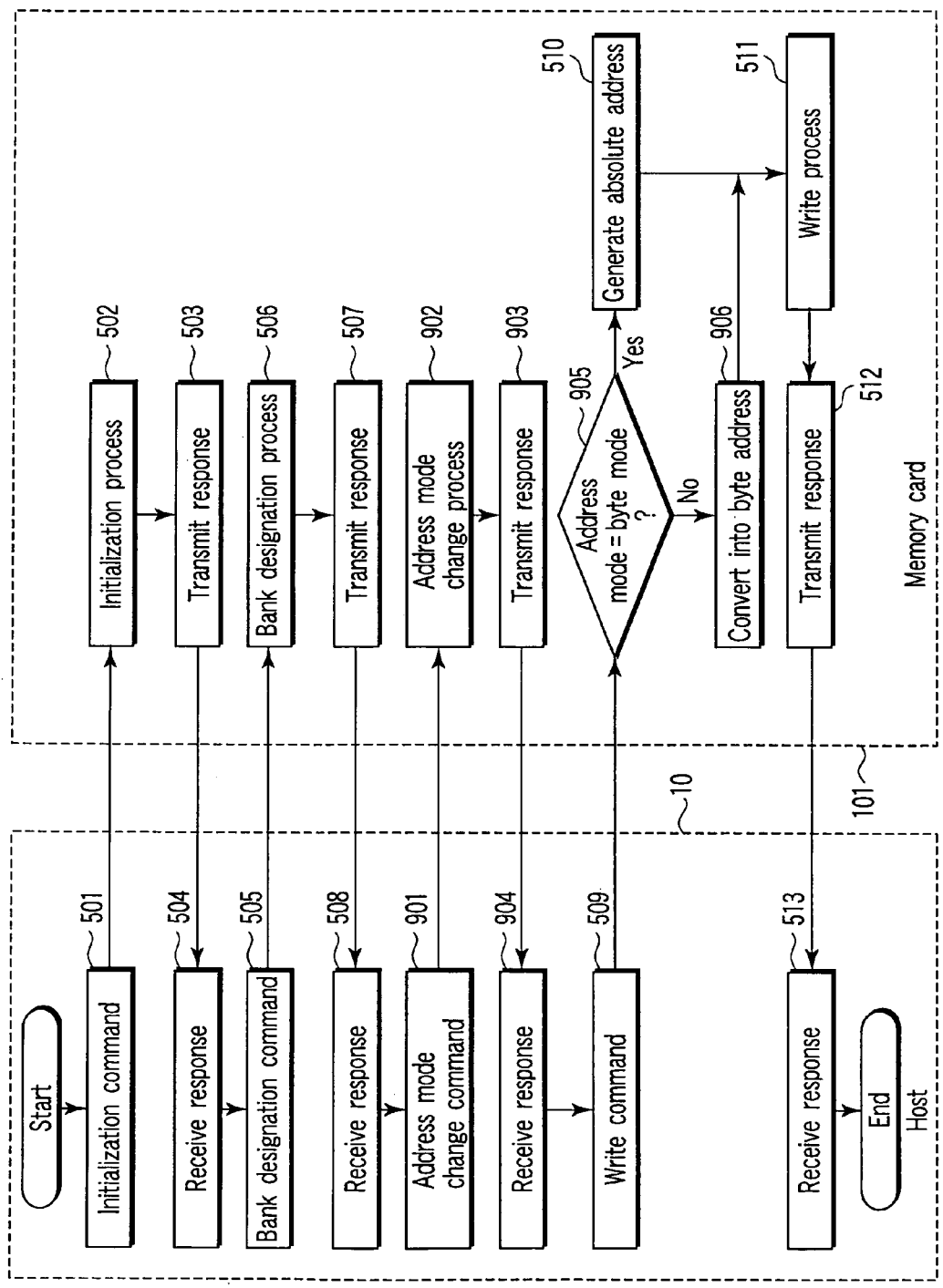
FIG. 12 is a flowchart showing the operation of the memory card in FIG. 8.

The operation of the SD memory card 101 will be described below with reference to FIG. 12. Assume that write data from the host apparatus 10 is written in an arbitrary bank. FIG. 12 is substantially the same as FIG. 5, except that steps 901 to 906 are added.

In step 501, the host apparatus 10 transmits an initialization command to the SD memory card 101. The card controller 114 of the SD memory card 101 executes a predetermined initialization process in step 502, and transmits a response indicating the end of the initialization process to the host apparatus 10 in step 503. In step 504, the host apparatus 10 receives the response, and confirms the end of the initialization process.

The host apparatus 10 transmits a bank designation command which includes the bank identification number (bank ID) used to designate a bank to be accessed to the SD memory card 101 in step 505. In place of the bank designation command, a card select command including the bank ID may be used. The card controller 114 of the SD memory card 101 executes a bank designation process in step 506. In this bank designation process, if the bank designation command designates bank 0, the card controller 114 of the SD memory card 101 holds "00" as the upper 2-bit value of an absolute address; if the bank designation command designates bank 1, it does not hold any upper 2-bit value. In step 507, the card controller 114 of the SD memory card 101 transmits a response indicating the end of the bank designation process to the host apparatus 10. In step 508, the host apparatus 10 receives the response, and confirms the end of the bank designation process.

If bank 1 is to be accessed, the host apparatus 10 transmits an address mode change command, which designates to change the address mode of the SD memory card 101 to a block address mode, to the SD memory card 101 in step 901. The block address mode can accept block addresses. On the other hand, if bank 0 is to be accessed, the host apparatus 10 transmits an address mode change command, which designates to change the address mode of the SD memory card 101 to a byte address mode, to the SD memory card 101 in step 901. The byte address mode can accept byte addresses.

The card controller 114 of the SD memory card 101 changes its address mode from the byte address mode to the block address mode or vice versa in accordance with the address mode change command in step 902. In step 903, the card controller 114 of the SD memory card 101 transmits a response indicating completion of address mode change to the host apparatus 10. The host apparatus 10 receives that response in step 904, and confirms that the SD memory card 101 has changed its address mode. Note that the default address mode of the SD memory card 101 is the byte address mode, and the SD memory card 101 operates in the byte address mode until it receives the address mode change command from the host apparatus.

In step 509, the host apparatus 10 transmits a write command to the SD memory card 101. This write command is appended with a 32-bit memory address as its command argument. This 32-bit memory address is a byte address if the bank to be accessed is bank 0, or a block address if it is bank 1. In step 905, the card controller 114 of the SD memory card 101 checks if the current address mode is the block or byte address mode.

If the current address mode is the block address mode, the card controller 114 of the SD memory card 101 advances to step 906. In step 906, the card controller 114 of the SD memory card 101 acquires a 32-bit memory address value from the command argument included in the write command, and converts this memory address value from a block address to a byte address (34-bit absolute address). In step 511, the card controller 114 of the SD memory card 101 executes a write process for writing write data, which is transmitted from the host apparatus 10 after the write command, at a storage position in the flash memory 116 designated by the byte address (34-bit absolute address). In the write process, the absolute address, write data, and write control signal are supplied to the flash memory 116 via the memory I/F 115.

On the other hand, if the current address mode is the byte address mode, the card controller 114 of the SD memory card 101 advances to step 510. In step 510, the card controller 114 of the SD memory card 101 acquires a 32-bit memory address value from the command argument included in the write command, and generates a 34-bit absolute address expanding this 32-bit memory address value using the held upper 2-bit value.

In step 511, the card controller 114 of the SD memory card 101 executes a write process for writing write data, which is transmitted from the host apparatus 10 after the write command, at a storage position in the flash memory 116 designated by the absolute address.

In step 512, the card controller 114 of the SD memory card 101 transmits a response indicating the completion of the write process to the host apparatus 10. In step 513, the host apparatus 10 receives the response and confirms the completion of the write process.

When a write command is received from an existing host apparatus which supports neither the bank designation function nor the block address mode, the card controller 114 of the SD memory card 101 can always access bank 0 in the byte address mode. As a result, the existing host apparatus can normally access bank 0.

(Third Embodiment)

The SD memory card 101 according to the third embodiment of the present invention will be described below.

The SD memory card 101 according to the third embodiment has an access control function that permits an access to each bank only when a predetermined condition is met, in addition to the arrangement of the first embodiment.

Figure 13:
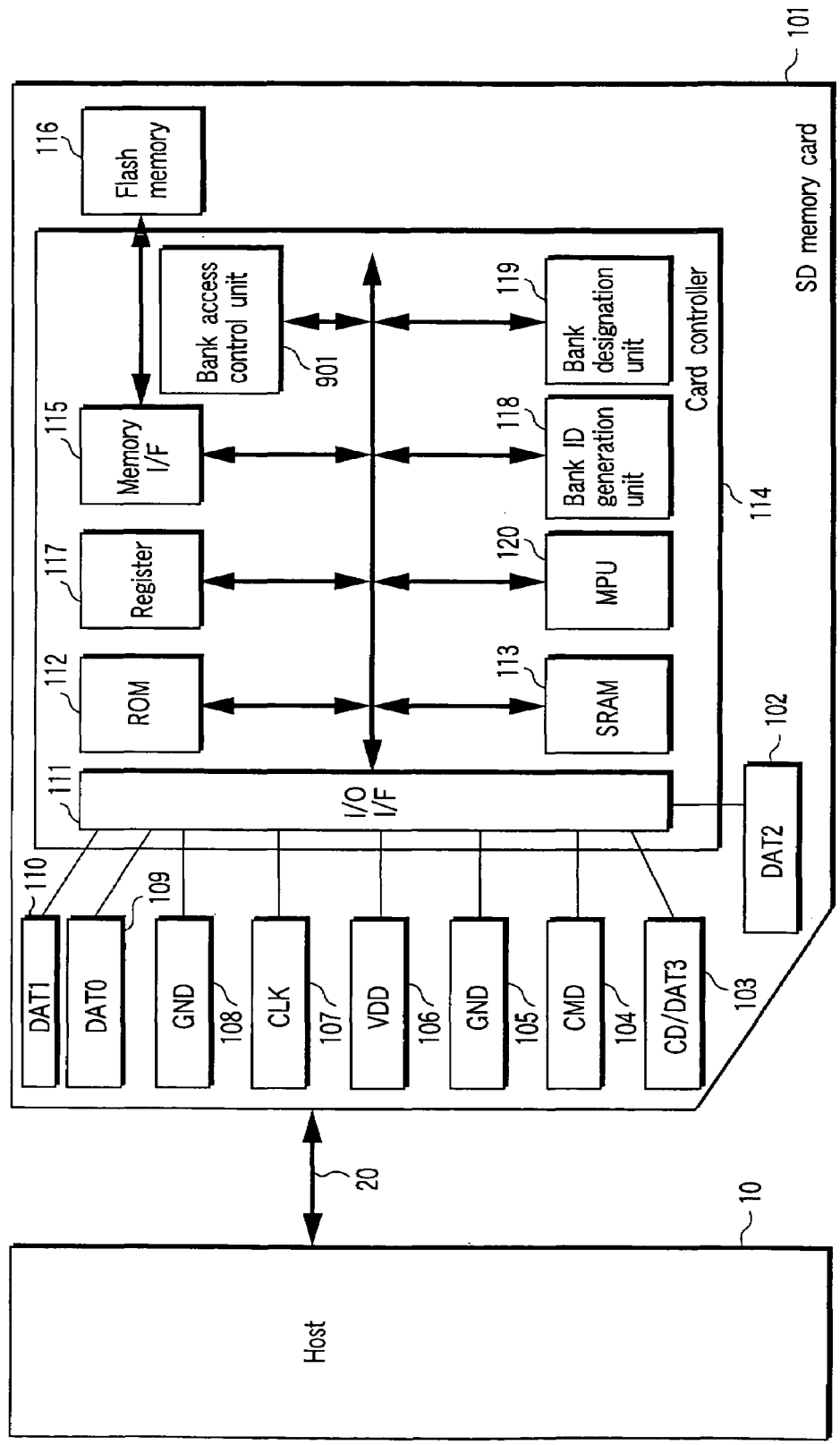
FIG. 13 is a block diagram showing the arrangement of a memory card according to the third embodiment of the present invention.

FIG. 13 is a block diagram showing the arrangement of the SD memory card 101 according to the third embodiment. The card controller 114 of this SD memory card 101 comprises a bank access control unit 901 in addition to the arrangement of FIG. 1. Other components are the same as those in FIG. 1. The bank access control unit 901 is provided to implement an access control function, and determines whether or not to permit an access by the host apparatus 10 for each bank.

FIG. 14 shows an access control table which specifies access permission conditions. This access control table stores accessible bank numbers, and the numbers of times of reception of a bank designation command. The bank access control unit 901 counts the number of times of reception of a bank designation command from the host apparatus 10, and looks up the access control table using the reception count of the bank designation command as an index, thus determining a bank which permits the host apparatus 10 to access. For example, in the access control table in FIG. 14, an access to bank 0 is permitted when the number of times of reception of a bank designation command is 3 or more. Likewise, an access to bank 1 is permitted when the number of times of reception of a bank designation command is 5 or more, an access to bank 2 is permitted when the number of times of reception of a bank designation command is 7 or more, and an access to bank 3 is permitted when the number of times of reception of a bank designation command is 9 or more.

Figure 15:
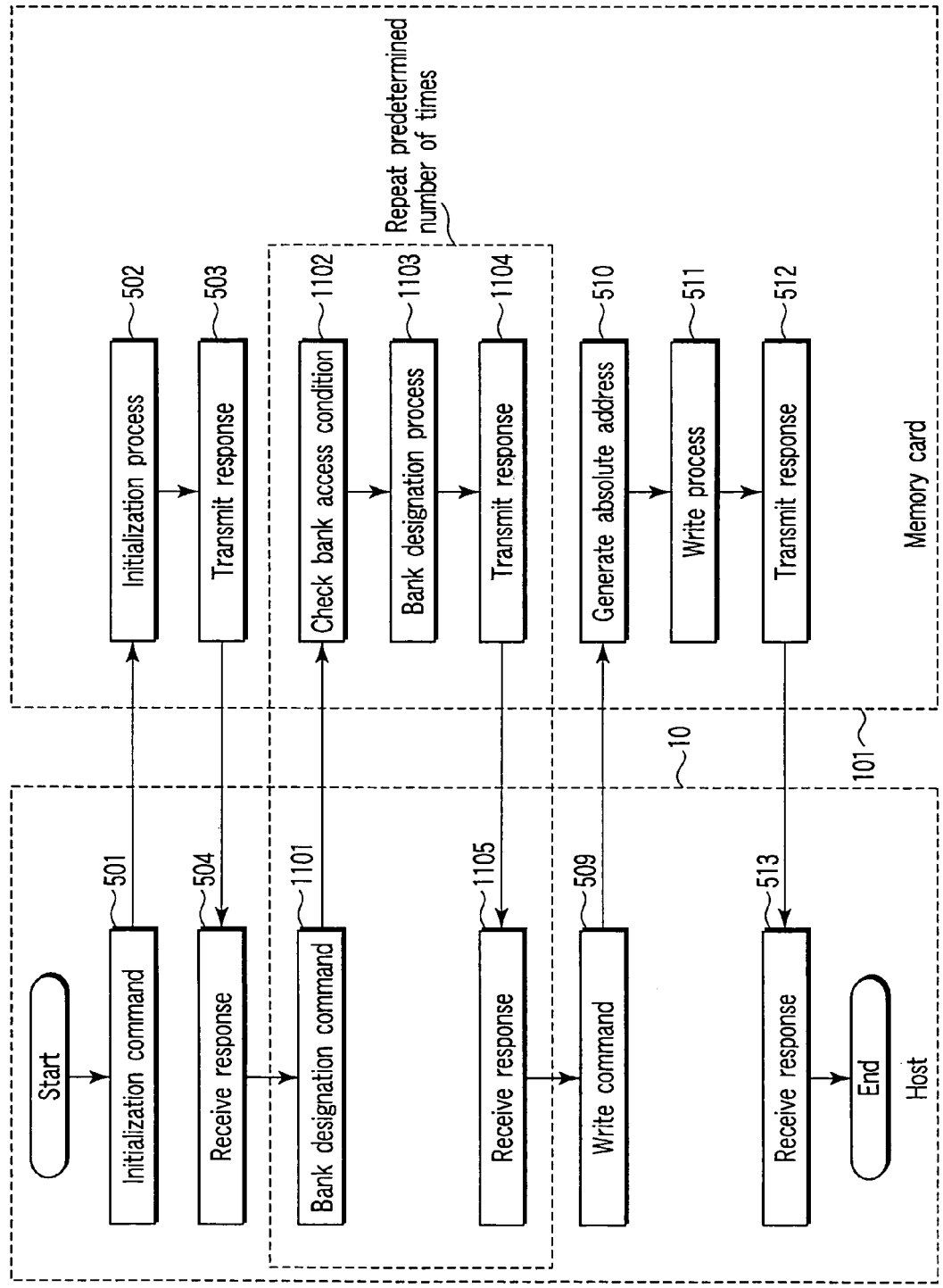
FIG. 15 is a flowchart showing the operation of the memory card in FIG. 13.

The operation of the SD memory card 101 will be described below with reference to FIG. 15. Assume that write data from the host apparatus 10 is written in an arbitrary bank. In this embodiment, steps 505 to 508 in FIG. 5 are replaced by steps 1101 to 1105.

In step 501, the host apparatus 10 transmits an initialization command to the SD memory card 101. The card controller 114 of the SD memory card 101 executes a predetermined initialization process in step 502, and transmits a response indicating the end of the initialization process to the host apparatus 10 in step 503. In step 504, the host apparatus 10 receives the response, and confirms the end of the initialization process.

The host apparatus 10 transmits a bank designation command which includes the bank identification number (bank ID) used to designate a bank to be accessed to the SD memory card 101 in step 1101. In place of the bank designation command, a card select command including the bank ID may be used. Upon reception of the bank designation command, the card controller 114 of the SD memory card 101 increments a value indicating the number of times of reception of the bank designation command by +1 in step 1102. When the first bank designation command is received after the initialization process, the number of times of reception of the bank designation command becomes 1. In step 1102, the card controller 114 of the SD memory card 101 determines an accessible bank number by the aforementioned method. If the bank to be accessed designated by the bank designation command is an accessible bank, the card controller 114 of the SD memory card 101 executes, as a bank designation process, a process for converting the bank ID value included in the bank designation command from the host apparatus 10 into the upper 2 bits of an absolute address, and holding the upper 2 bits in step 1103. If the bank to be accessed designated by the bank designation command is not an accessible bank, the bank designation process is not executed. In step 1104, the card controller 114 of the SD memory card 101 transmits a response indicating the end of bank designation to the host apparatus 10. This response can include information indicating success/failure of the bank designation process. In step 1105, the host apparatus 10 receives the response, and confirms if the bank designation process has succeeded. The host apparatus 10 executes step 1101 again as needed to access a desired bank. Steps 1102, 1103, and 1104 are executed in the same sequence accordingly.

A state wherein the bank designation command has been received three times will be explained below as an example of bank access control. In a state wherein the bank designation command has been received three times, it is determined with reference to the access control table of FIG. 14 that bank 0 is accessible. If the bank designated by the bank designation command is 0, the process for converting the bank ID corresponding to bank 0 into the upper 2 bits of the absolute address corresponding to that bank 0 is executed. In this way, the host apparatus 10 can access bank 0. However, if the bank designated by the bank designation command is 1, the bank designation process is not executed. As a result, an access to bank 1 is inhibited. As a method of inhibiting an access to bank 1, a method of converting the bank ID into upper bits of a memory address of a nonexistent bank, a method of converting the bank ID into the upper 2 bits of an absolute address corresponding to a specific bank (e.g., bank 0), and setting the specific bank as an access target bank all the time, and the like may be used in addition to the method of skipping the bank designation process.

If the host apparatus 10 receives the response and recognizes that the designated bank is accessible in step 1105, it executes processes in step 509 and subsequent step to write data. In step 509, the host apparatus 10 transmits a write command to the SD memory card 101. This write command is appended with a 32-bit memory address as its command argument. Upon reception of the write command, the card controller 114 of the SD memory card 101 generates a 34-bit absolute address by extracting the 32-bit memory address value from the command argument appended to the write command, and expanding this 32-bit memory address value using the held upper 2-bit value in step 510. In step 511, the card controller 114 of the SD memory card 101 executes a write process for writing write data, which is transmitted from the host apparatus 10 after the write command, at a storage position in the flash memory 116 designated by the 34-bit absolute address. In the write process, the absolute address, write data, and write control signal are supplied to the flash memory 116 via the memory I/F 115. In step 512, the card controller 114 of the SD memory card 101 transmits a response indicating the completion of the write process to the host apparatus 10. In step 513, the host apparatus 10 receives the response and confirms the completion of the write process.

With the aforementioned access control, the table which specifies accessible banks is used, and a corresponding bank is permitted to access if the number of times of reception of the bank designation command is reached. However, the access control method is not limited to this, and bank access can be limited using various other methods.

According to the embodiments described above, an accessible memory address space can be expanded while maintaining the compatibility to an existing host apparatus which does not support the block addressing method.

In the above embodiments, the user data area of the SD memory card is divided into a plurality of banks to be managed. However, the present invention is not limited to the user data area, and the protection area may be divided into a plurality of banks. In such case, in order to access the protection area, the aforementioned CPRM scheme must be used. The above embodiments have exemplified the SD memory card. However, the arrangements of the bank control of the respective embodiments can be applied to various other memory cards which can be detachably connected to a host apparatus. A "memory card" is a generic name of a removable storage device, and does not limit its physical shape.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory card device which is detachably connected to a host apparatus, comprising:
   a host interface unit configured to communicate with the host apparatus and receive a plurality of commands from the host apparatus, the commands including at least a memory access command with a memory address of a specific bit width;
   a nonvolatile semiconductor memory which includes a storage area whose memory size is larger than a maximum memory size that is addressable by the memory address of the specific bit width;
   a bank identification number management unit configured to divide the storage area of the nonvolatile semiconductor memory into a plurality of banks and manage a plurality of bank identification numbers corresponding to the banks;
   a bank designation unit configured to designate one of the banks in accordance with a bank identification number included in a bank designation command transmitted from the host apparatus; and
   a memory control unit configured to access the designated one of the banks in accordance with the memory access command with the memory address of the specific bit width.

2. The device according to claim 1, further comprising:
   a card address generation unit configured to generate a card address used to identify the memory card device in response to a card address generation command transmitted from the host apparatus, and transmit the generated card address to the host apparatus, and
   wherein the bank identification number management unit is configured to generate the bank identification numbers corresponding to the banks based on the generated card address and assign the bank identification number equal to the generated card address value to a specific one of the banks, and
   the bank designation command is a card select command which includes a value generated from the card address as the bank identification number, the card select command being used to switch an operation mode of the memory card device to a transfer mode that allows data transfer with the host apparatus.

3. The device according to claim 1, wherein the bank identification number management unit is configured to generate the bank identification numbers corresponding to the banks based on a card address used to identify the memory card device, and
   the bank designation command is a card select command which includes a bank identification number generated based on the card address, and the card select command being used to switch an operation mode of the memory card device to a data transfer mode which allows data transfer with the host apparatus, and
   the bank designation unit is configured to designate one of the banks as an access target bank in accordance with the bank identification number included in the card select command.

4. The device according to claim 1, further comprising:
   a card address generation unit configured to generate a card address used to identify the memory card device in response to a card address generation command transmitted from the host apparatus, and to transmit the card address to the host apparatus, and
   wherein the bank identification number management unit is configured to generate the bank identification numbers corresponding to the banks based on the card address generated by the card address generation unit.

5. The device according to claim 4, wherein the bank identification number corresponding to a specific one of the banks is equal to the card address value.

6. The device according to claim 4, wherein the bank designation command is a card select command which is transmitted from the host apparatus and is used to switch an operation mode of the memory card device to a data transfer mode which allows data transfer with the host apparatus.

7. The device according to claim 1, wherein the bank identification number management unit is configured to generate the bank identification numbers corresponding to the banks based on a card address used to identify the memory card device,
   the bank designation command is a card select command which is transmitted from the host apparatus, includes the bank identification number generated based on the card address, and is used to switch an operation mode of the memory card device to a data transfer mode which allows data transfer with the host apparatus, and
   the bank designation unit is configured to designate one of the banks as an access target bank in accordance with the bank identification number included in the card select command.

8. The device according to claim 1, wherein the bank identification number management unit is configured to transmit the bank identification numbers corresponding to the banks to the host apparatus in response to a request from the host apparatus.

9. The device according to claim 1, wherein each of the banks has a memory size not larger than a maximum memory size which is addressable by the memory address of the specific bit width.

10. The device according to claim 1, wherein the banks include a first bank which has a memory size not larger than a maximum memory size which is addressable by the memory address of the specific bit width, and a second bank which has a memory size larger than the maximum memory size, and the memory card device further comprises a unit configured to access the second bank for each block which has a length of a plurality of bytes in accordance with the memory access command which includes the memory address of the specific bit width.

11. The device according to claim 1, further comprising an access control unit configured to determine whether to permit an access by the host apparatus for each bank.

12. A memory card device which is detachably connected to a host apparatus, comprising:
- a host interface unit configured to communicate with the host apparatus and receive a plurality of commands from the host apparatus, the commands including at least a card address generation command used to request generation of a card address for identifying the memory card device, a card select command that includes a value generated from the card address as a bank identification number, and is used to switch an operation mode of the memory card device to a transfer mode that allows data transfer with the host apparatus, and a memory access command with a memory address of a specific bit width;
- a nonvolatile semiconductor memory which has a storage area whose memory size is larger than a maximum memory size that is addressable by the memory address of the specific bit width;
- a card address generation unit configured to generate the card address and transmit the card address to the host apparatus in response to the card address generation command;
- a bank identification number management unit configured to divide the storage area of the nonvolatile semiconductor memory into a plurality of banks and manage values generated from the card address as the bank identification numbers corresponding to the banks;
- a bank designation unit configured to designate one of the banks as an access target bank in accordance with the bank identification number included in the card select command; and
- a memory control unit configured to access the designated one of the banks in accordance with the memory access command with the memory address of the specific bit width.

13. The device according to claim 12, wherein the bank identification number corresponding to a specific one of the banks is equal to the card address value.

14. A method of controlling a memory card device which is detachably connected to a host apparatus, comprising:
- receiving a plurality of commands from the host apparatus, the commands including at least a memory access command with a memory address of a specific bit width;
- dividing a storage area of a nonvolatile semiconductor memory, which has a storage area whose memory size is larger than a maximum memory size that is addressable by the memory address of the specific bit width, into a plurality of banks, and generating a plurality of bank identification numbers corresponding to the banks based on a card address used to identify the memory card device;
- designating one of the banks as an access target bank in accordance with a card select command which is transmitted from the host apparatus, the card select command including a value generated based on the card address as the bank identification number, and being used to switch an operation mode of the memory card device to a transfer mode that allows data transfer with the host apparatus; and
- accessing the one of the banks designated as the access target bank in accordance with the memory access command With the memory address of the specific bit width.

15. The method according to claim 14, wherein the bank identification number corresponding to a specific one of the banks is equal to the card address value.

* * * * *